No. 863,084. PATENTED AUG. 13, 1907.
R. A. McKEE.
VALVE MECHANISM.
APPLICATION FILED SEPT. 12, 1906.
3 SHEETS—SHEET 1.
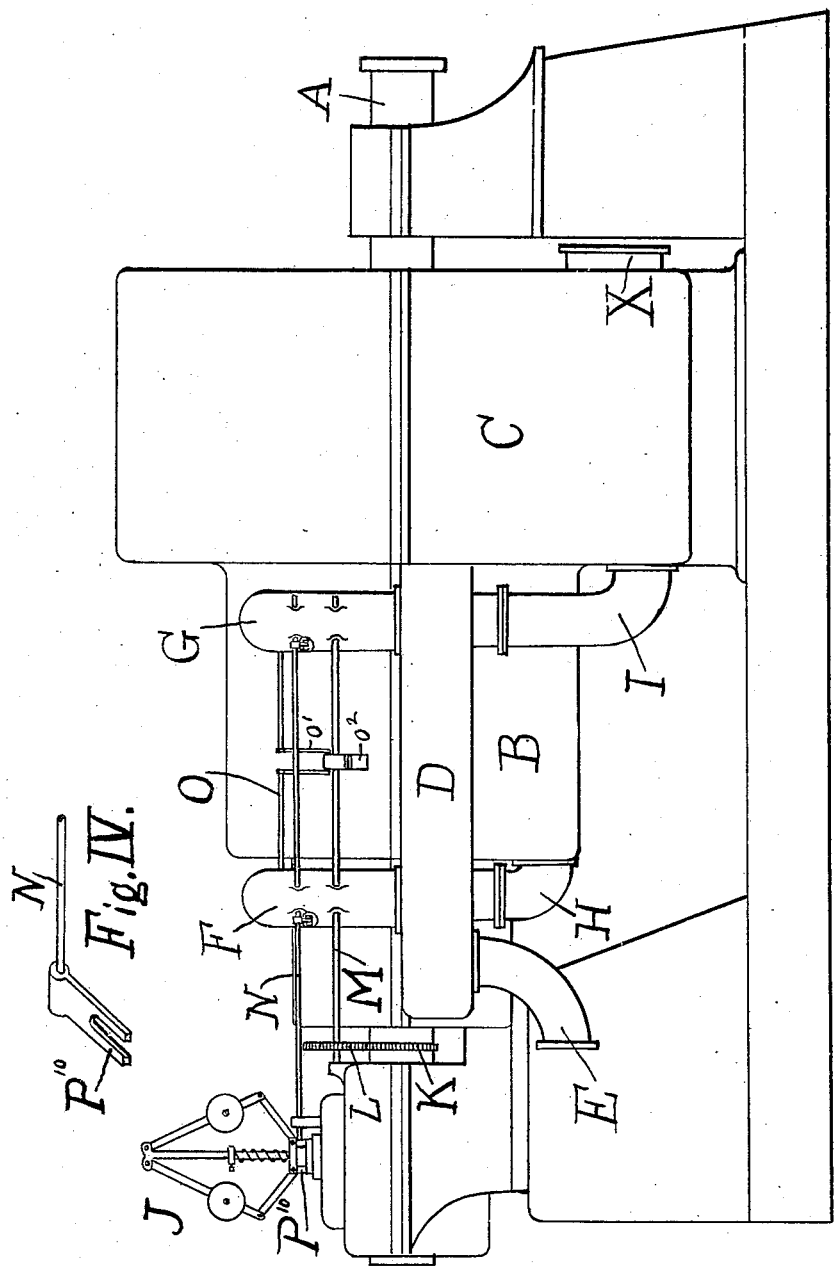
Fig. I.
Fig. IV.
WITNESSES:
Frank E. Dennett
Ella Brickell
R. A. McKee INVENTOR
BY
ATTORNEY.

No. 863,084. PATENTED AUG. 13, 1907.
R. A. McKEE.
VALVE MECHANISM.
APPLICATION FILED SEPT. 12, 1906.
3 SHEETS—SHEET 2.
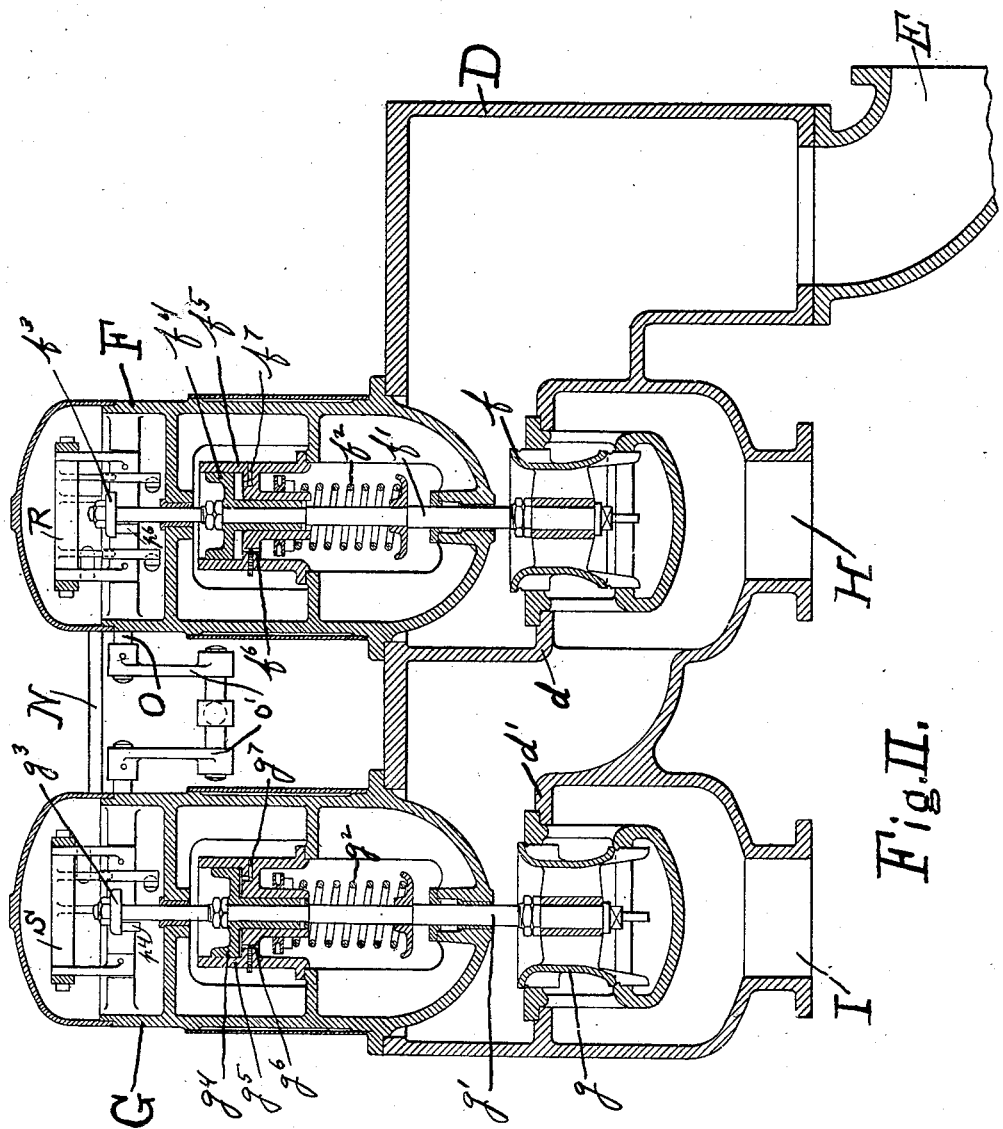

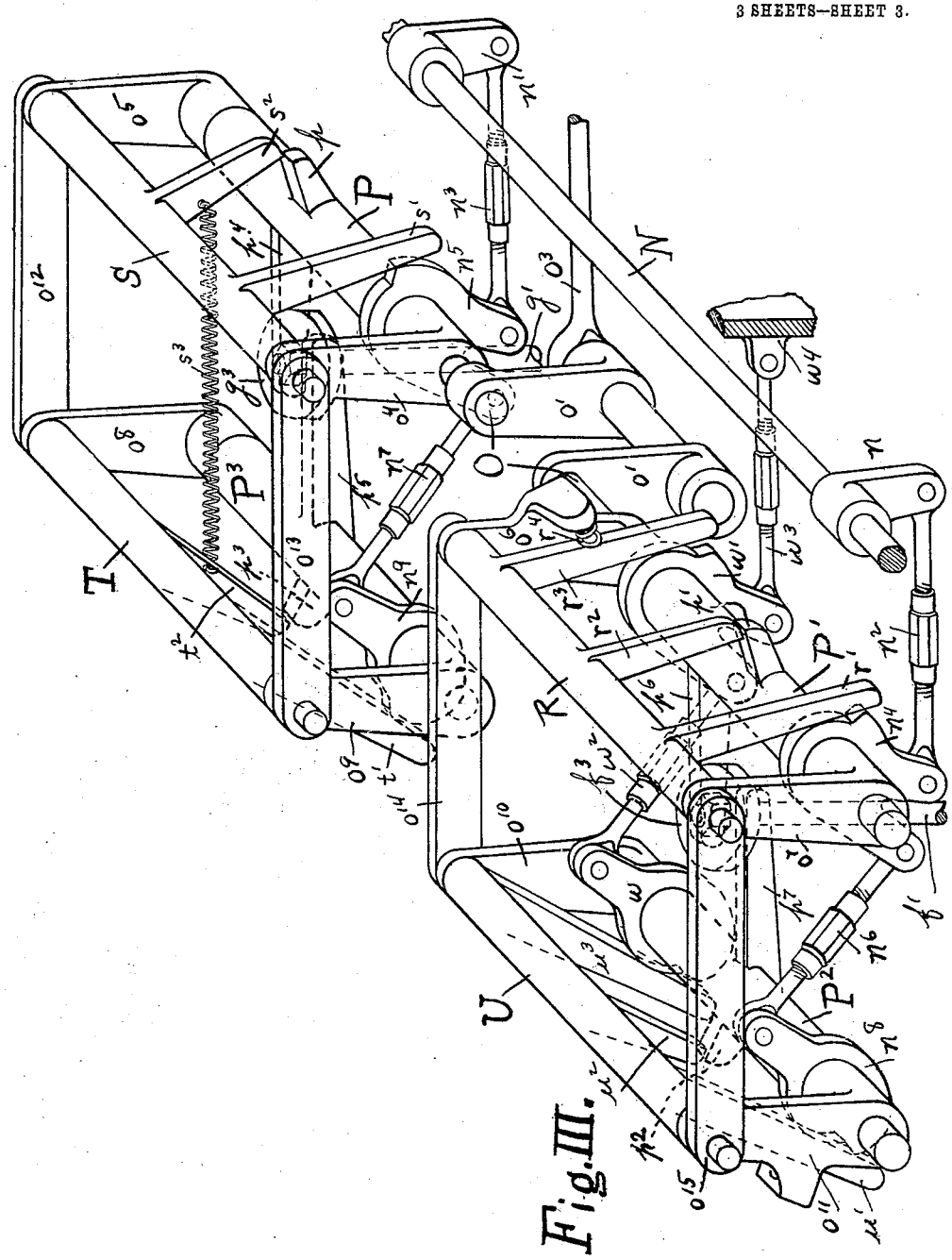

UNITED STATES PATENT OFFICE.

ROBERT A. McKEE, OF MILWAUKEE, WISCONSIN, ASSIGNOR TO ALLIS-CHALMERS COMPANY, OF MILWAUKEE, WISCONSIN, A CORPORATION OF NEW JERSEY.

VALVE MECHANISM.

No. 863,084.  Specification of Letters Patent.  Patented Aug. 13, 1907.

Application filed September 12, 1906. Serial No. 334,217.

*To all whom it may concern:*

Be it known that I, ROBERT A. McKEE, a citizen of the United States, residing at Milwaukee, in the county of Milwaukee and State of Wisconsin, have invented a certain new and useful Valve Mechanism, of which the following is a specification.

This invention relates to valve mechanism and especially to the specific combination of a plurality of puffing valves to be hereinafter described and the combination of said valves with an elastic fluid engine.

As the work required from an elastic fluid engine is sometimes in excess of the engine's normal capacity, it has been proposed to make provision for such excess or "overload" by admitting the motive fluid at full pressure into a part of the engine where it is ordinarily used "expansively" at a lower pressure.

In reciprocating engines provided with high pressure cylinders to which steam is admitted at its normal pressure and low pressure cylinders in which the steam is used "expansively" at a pressure lower than normal, it has been proposed to take care of an overload by admitting the steam at its normal pressure into the low pressure cylinders also.

In rotary engines, including steam turbines, it has been proposed to take care of an overload by also admitting the steam at its normal pressure into a part of the engine between the main inlet and the exhaust where in the normal operation of the engine it is used at less than normal pressure.

In continuous acting or rotary engines, including steam turbines, it is necessary at normal load to use a continuous and uninterrupted blast of steam in order to realize the full power of the engine economically. When such an engine is running at less than normal load a continuous blast of throttled steam is not as economical as puffs of steam admitted at intervals and at full steam pressure.

This invention comprises the combination with a continuous acting engine so constructed as to use an elastic fluid expansively, such as, for example, a rotary engine of a main puffing valve for admitting the motive fluid thereto in puffs at normal pressure when the engine is working at less than its normal load, said valve being adapted to be retained open so as to admit an uninterrupted blast of fluid at normal pressure when the engine is working at normal load and a second puffing valve adapted to admit motive fluid in puffs at normal pressure into an expansion stage of the engine while the main valve is open. A third valve, or more, could also be used by simply extending the same principle, but it has been deemed sufficient to illustrate only two valves as they fully disclose the principle and operation of this invention, the result attained being the complete control of the engine when running at under load, normal load or overload, and the most economical working of the engine under either of these three conditions of load. By controlling the valves by a governor responsive to the speeds of the engine, the valves are operated automatically to take care of variations of load upon the engine.

This invention further comprises structure of valve mechanism for accomplishing the results stated above.

By the expression "expansion stage" as used in this specification is meant any part of an engine in which an elastic fluid is used as a motive fluid by virtue of its tendency to expand, the pressure of scuh fluid in such part of the engine under normal conditions of operation being lower than the initial pressure of the fluid supplied to said engine.

In the accompanying drawings this invention is illustrated as applied to a steam turbine of the well-known Parsons type, but it is to be understood that this illustration is simply for the purpose of exhibiting one application of the improved valve mechanism described and claimed in this specification, and is not to be construed as limiting the application of this valve mechanism to a steam turbine or to a steam turbine of any particular type, except as a particular claim may so limit it.

In the drawings which form a part of this specification and on which the same reference characters are used to designate the same elements in each of the several views,—Figure 1 represents an elevation of a steam turbine of the Parsons type with this improved mechanism applied thereto. Fig. 2 represents a vertical section through the steam chest and valve casings of the valve mechanism shown by Fig. 1. Fig. 3 is a perspective in detail of the valve operating mechanism removed from the valve casings in order to clearly show the structure and relation of the several parts of the mechanism. Fig. 4 is a perspective of a detail of the governor connection.

The turbine shown by Fig. 1 comprises a suitable base upon which is supported the turbine including its shaft A, said turbine consisting of the admission stage B and the expansion stage C.

D represents the steam chest to which steam is supplied through the supply pipe E and from which steam is admitted through a port into the pressure stage B of the turbine through the pipe H, the passage of said steam being controlled by the valve mechanism F.

The reference character G represents a second valve mechanism which controls the passage of steam from the steam chest D through the thoroughfare of the pipe I and a port into the expansion stage of the turbine C.

The reference character X represents the exhaust passage from the turbine.

The shaft A is provided with a motion-transmitting mechanism such as the pinion K, which is adapted to mesh with a pinion L secured upon the shaft M, which, through the instrumentality of an eccentric $o^2$, connected with a crank $o'$, is adapted to oscillate the shaft O, which in turn is adapted to operate the steam valves of the valve mechanisms F and G.

The reference character J represents an ordinary type of governor which is adapted to respond to variations of speed of the shaft A either immediately or mediately, (no specific means for effecting this result being shown, as any of the ordinary forms of connection may be adopted). As the balls of this governor J rise and fall due to variations in speed of the shaft A, motion is communicated through the bifurcated lever or yoke $P^{10}$ to the shaft N, which in turn controls the operation of the steam valves of the valve mechanisms F and G.

In Figs. 2 and 3 are shown in detail the specific structures of the valve mechanisms F and G. Referring to Fig. 2 it will be noticed that steam entering through the supply pipe E will pass into the steam chest D and, if the valve $f$, which serves as an automatic throttle valve, be open, will pass through the thoroughfare controlled by said valve and will then pass out to the turbine through the pipe H. If, at the same time that the valve $f$ is open, the valve $g$ is open, the steam can also pass through the thoroughfare controlled by said latter valve and into the turbine through the pipe I. The two valve mechanisms F and G comprise the following elements, viz., the valve $f$ adapted to close the thoroughfare through the partition $d$ of the steam chest D; a valve-operating rod $f'$ secured to said valve; a spring $f^2$ retained between a projection on said valve-operating stem and a fixed part of the valve casing, the function of said spring being to return the valve $f$ rapidly to its seat. The valve-operating stem $f'$ is provided with an enlargement or head $f^3$ which is adapted to be operated upon by arms of the valve-operating mechanism to raise said valve from its seat in a manner which will be described presently. Attached to the valve-operating stem $f'$ is a piston $f^4$ which is adapted to move in a cylinder $f^5$ in order to prevent the valve slamming on its seat when closed by the spring $f^2$, the cylinder and piston forming a dash pot or retarding device, air being admitted to the cylinder beneath the piston on the up-stroke of the same through the ball valve controlled passageway $f^7$ and being forced outwardly therefrom through the screw controlled passageway $f^6$ on the down-stroke of the piston.

The structure of the valve mechanism G is a duplicate of the mechanism just described, the reference character $g$ with corresponding superscripts indicating corresponding elements.

As before described, the shaft O is adapted to receive an oscillating movement resulting from the rotation of the shaft A. This oscillating movement is utilized to raise the valves $f$ and $g$ from their seats against the tension of the springs $f^2$ and $g^2$ in the following manner: Referring to Fig. 3, it will be seen that the shaft O, which is oscillated by means of the crank $o'$ and connecting rod $o^3$, which latter is connected to the eccentric $o^2$, is rigidly secured to the crank arms $o^4$, $o^5$, $o^6$, $o^7$, so that these crank arms oscillate with the shaft O. Sleeved upon the shaft O are the movable members P and P', and suitably sleeved upon supporting members are similar movable members $P^2$ and $P^3$. Secured preferably upon the same supporting member as the member $P^3$, are the movable crank arms $o^8$ and $o^9$, while secured upon the same supporting member as the member $P^2$ are the movable crank arms $o^{10}$, $o^{11}$. The crank arms $o^4$ and $o^5$ are united by a member S, while the crank arms $o^8$ and $o^9$ are united by a member T; the members S and T being united by the connecting links $o^{12}$ and $o^{13}$. The crank members $o^6$ and $o^7$ are united by the member R, and the crank members $o^{10}$ and $o^{11}$ are united by the member U, the members R and U being united by the link members $o^{14}$ and $o^{15}$. The members P, P', $P^2$ and $P^3$ are each provided with a projection $p$, $p'$, $p^2$, $p^3$ respectively, and an arm $p^4$, $p^5$, $p^6$, $p^7$ respectively, these arms being adapted to engage with the enlargements or heads $f^3$ and $g^3$ of the valve-operating stems $f'$ and $g'$ respectively, in order to lift said valves from their seats.

In order to operate the arms just referred to, means are provided for contacting with the projections $p$, $p'$, $p^2$, $p^3$, in order to cause the members P, P', $P^2$, $P^3$ to oscillate about their respective supports. The member S is provided with the projecting fingers $s'$, $s^2$, while the member T is provided with the projecting fingers $t'$, $t^2$, the fingers $s^2$, $t^2$ being shown as connected by the spiral spring $s^3$. The member R is provided with the projecting fingers $r'$, $r^2$, $r^3$, while the member U is provided with corresponding projecting fingers $u'$, $u^2$, $u^3$; the fingers $u'$ and $r^3$ being acted upon respectively by spiral springs, as clearly indicated by $r^4$. The purpose of these springs is to retain certain of the fingers upon the cams with which they are adapted to coöperate. Located upon the shaft O as a convenient support but movable independently therefrom are the cams $n^4$, $n^5$ which are connected by means of the adjustable rods $n^2$ and $n^3$ with the crank arms $n$, $n'$ rigidly secured to the shaft N, which shaft through the medium of the bifurcated lever or yoke $P^{10}$ is oscillated by the movements of the governor J. Cams $n^8$ and $n^9$ are movably supported upon the same supports as members $P^2$ and $P^3$ respectively, and are connected with cams $n^4$ and $n^5$ by adjustable connecting rods $n^6$ and $n^7$.

The operation of the parts just described is as follows: The turbine being in operation, the shaft A is revolving and transmits its motion through the pinions K, L, shaft N, eccentric $o^2$, connecting rod $o^3$, crank $o'$, to the shaft O which is not rotated as the result of this movement, but is simply oscillated. The oscillations of shaft O are accompanied by similar oscillations of the crank arms $o^4$, $o^5$, $o^6$, $o^7$, secured thereto, and these crank arms in turn cause similar oscillations of the crank arms $o^8$, $o^9$, $o^{10}$, $o^{11}$, because of the connecting links $o^{12}$, $o^{13}$, $o^{14}$, and $o^{15}$. As the crank arms $o^4$ and $o^5$, for example, swing to the right (see Fig. 3), the projecting finger $s^2$ engages with the projection $p$, thereby oscillating said member P and rocking upward the arm $p^4$, which being engaged under the head $g^3$ of the valve-operating stem $g'$, lifts said valve from its seat in opposition to the spring $g^2$. The projecting finger $r^2$ in a similar manner and at the same time causes the valve $f$ to be raised from its seat through similar instrumentalities, viz., the projection $p'$, arm $p^6$ and head $f^3$ of the valve-operating rod $f'$. On the reverse oscillation these several parts would return to their normal position were it not for the fact that these operating elements just enumerated are duplicated while their action is the reverse of those just mentioned. For example, while the parts $s^2$, $p$, $p^4$, $g^3$, are returning to their normal position as the result of the crank arms $o^4$ and $o^5$ swinging to the left, the finger $t^2$ contacts with the projection $p^3$, oscillates the member $P^3$, swinging upwardly the arm $p^5$ which engages under the head $g^3$ of the valve-operating stem $g'$. The projecting finger $u^2$ contacts with the projection $p^2$, raises the arm $p^7$ with the head or projection $f^3$ in the same way and at the same time. It will thus be seen that if the parts enumerated were the only parts to control the valves, the valves would be lifted to their extreme open positions by an oscillation of the crank arms $o^4$, $o^5$, $o^6$, $o^7$, to the right (see Fig. 3), and would be returned towards their seats by the springs $f^2$ and $g^2$ as the arms $p^4$ and $p^6$ were lowered as the result of an oscillation of said crank arms to the left. In order that the valves may be returned suddenly to their seats by the action of the springs $f^2$ and $g^2$, means are provided for disengaging the projecting fingers $s^2$, $t^2$, $r^2$, $u^2$, from the projection $p$, $p^3$, $p'$, $p^2$, respectively, such means consisting of the cams $n^5$, $n^9$, $n^4$, $n^8$, which are connected with the governor, as already described. Each of these cam members upon which respectively the projecting fingers $s'$, $t'$, $r'$ and $u'$ are adapted to rest, is provided with a projection, said projections being of sufficient height to cause an amplitude of oscillation of the members S, T, R and U that will move the projecting fingers $s^2$, $t^2$, $r^2$ and $u^2$ out of the path of oscillation respectively of the projections $p$, $p^3$, $p'$, $p^2$, thereby allowing the valves $f$ and $g$ to be returned to their seats by the spring $f^2$ and $g$.

In the position of the parts as shown by Fig. 3 with the head $f^3$ engaging arms $p^6$ and $p^7$ and the head $g^3$ engaging arms $p^4$ and $p^5$, both valves $f$ and $g$ would be off their seats to the theoretical lift for the valves. If now the crank arms $o^4$, $o^5$, $o^6$ and $o^7$ were oscillated to the right (Fig. 3), the arms $p^4$ and $p^6$ would lift the valves still further from their seats, viz., to their extreme limit of movement. On the reverse oscillation the valves would return towards their seats by reason of the tension of the springs $f^2$ and $g^2$ but would be prevented from moving faster than the arms $p^4$ and $p^6$ by reason of the heads $g^3$ and $f^3$ engaging with said arms. When the position shown by Fig. 3 is reached the heads $g^3$ and $f^3$ would be engaged by the arms $p^5$ and $p^7$ which would be moving upwards and the valves would again be moved to their limit of opening without having closed. This additional length of stroke for the valves is provided so that while they are open and provide the theoretical opening for the passage of steam they may be kept in motion to prevent any tendency to stick. In the structure as shown the valves are forced open positively by the movement of the engine but they are closed by the tension of springs and if the valves were to retain fixed positions for any considerable length of time it is possible that the parts would become so dirty and corroded that the springs could not move them when required to do so. In order that the valves may operate as puffing valves and return at intervals to their seats, the knock-off cams $n^4$, $n^5$, $n^8$ and $n^9$ are provided as described above.

The operation of the mechanism is as follows: Cams $n^5$ and $n^9$ are adjusted by means of the adjustable connecting rod $n^7$ so that the fingers $s^2$ and $t^2$ will be disengaged from the projections $p$ and $p^3$ at corresponding intervals and cams $n^4$ and $n^8$ are similarly adjusted to cause the disengagement of fingers $r^2$, $u^2$ and projections $p'$ and $p^2$. The governor balls are then raised to their highest position and cams $n^4$ and $n^8$ so adjusted by means of the adjustable connecting rod $n^2$ that either the finger $r^2$ is disengaged from the projection $p'$ or the finger $u^2$ from the projection $p^2$ at the instant the valve starts to open. In other words, so that the valve is not opened at all. The governor balls are then lowered to the position which they would assume at normal load and for such a position of the governor balls the projections on the cams $n^4$ and $n^8$ will not engage the fingers $r'$ or $u'$ during the movement of the mechanism. The governor balls are now lowered a trifle and the cams $n^5$ and $n^9$ adjusted by means of the adjustable connecting rod $n^3$ so that either the finger $s^2$ is disengaged from the projection $p$ or the finger $t^2$ from the projection $p^3$ immediately after the valve $g$ opens. With an under load on the engine and a tendency to higher speed and consequent elevation of the governor balls, the valve $g$ is closed and the valve $f$ is puffing, the duration of the puffs depending upon the position of the cams $n^4$ and $n^8$ as determined by the position of the governor balls. Now as additional load is thrown on the engine and the speed lowers and the governor balls drop, the duration of the puffs of the valve $f$ becomes longer and longer—the load being supposed to increase meanwhile—until finally the cams $n^4$ and $n^8$ have been moved around so far that the valve $f$ stops puffing, that is, it is no longer released and permitted to return to its seat but is retained open. On a further decrease of speed and consequent lowering of the governor balls, valve $g$ will commence to puff and with an increase of load and lower speed of the engine the duration of its puffs will be increased.

By means of the apparatus described it is possible to control an engine according to the work imposed upon it from the minimum up to and including the normal maximum for which the engine is designed, and it is further possible in case of an overload to increase the capacity of the engine and still control it while it is overloaded.

The cams $w$ and $w'$ (Fig. 3) connected by the adjustable connecting rod $w^2$ are connected by the adjustable connecting rod $w^3$ with a fixed part $w^4$ of the valve casing. These cams are provided so that the valve $f$ may be kept puffing if it should be considered desirable after the cams $n^4$ and $n^8$ have been moved by the governor to such a position that they no longer cause the fingers $r^2$ and $u^2$ to be disengaged from the projections $p'$ and $p^2$. The projecting fingers $r'$, $s'$, $t'$ and $u'$ constitute vibrating levers, and the variable fulcrums for said levers are the cams $n^4$, $n^5$, $n^9$ and $n^8$, upon which the levers are rocked.

What I claim is:

1. The combination with a continuous acting engine, such, for example, as a rotary engine or turbine, adapted to be actuated by an elastic fluid, said engine being provided with a main inlet for an operating fluid and an exhaust, said engine being also provided with an expansion stage, said expansion stage being provided with an auxiliary inlet for operating fluid, positively actuated valve mechanism for controlling said inlets, a governor responsive to the speeds of the engine for controlling said valve mechanism to admit the operating fluid through said main inlet in puffs at under loads and in an uninterrupted blast at normal and overloads and to admit operating fluid through said secondary inlet only while an uninterrupted blast of fluid is being admitted through said main inlet.

2. The combination with a continuous acting engine, such, for example, as a rotary engine or turbine, adapted to be actuated by an elastic fluid, said engine being provided with a main inlet for an operating fluid and an exhaust, said engine being also provided with an expansion stage, said expansion stage being provided with an auxiliary inlet for operating fluid, a positively actuated valve for controlling the flow of the operating fluid through said main inlet, a second valve for controlling the flow of operating fluid through said auxiliary inlet, a governor responsive to the speeds of the engine for controlling the action of said valves, said first mentioned valve being adapted to admit the operating fluid in puffs while the engine is running at under loads and in an uninterrupted blast when the engine is running at normal and overloads, said second valve being so arranged that it admits operating fluid only while the first mentioned valve is admitting fluid in an uninterrupted blast.

3. The combination with a continuous acting engine, such, for example, as a rotary engine or turbine, adapted to be actuated by an elastic fluid, said engine being provided with a main inlet for an operating fluid and an exhaust, said engine being also provided with an expansion stage, said expansion stage being provided with an auxiliary inlet for operating fluid, a positively actuated valve for controlling the flow of the operating fluid through said main inlet, a second positively actuated valve for controlling the flow of operating fluid through said auxiliary inlet, a governor responsive to the speeds of the engine for controlling the action of said valves, said first mentioned valve being adapted to admit the operating fluid in puffs while the engine is running at underloads and in an uninterrupted blast when the engine is running at normal and overloads, said second valve being so arranged that it admits operating fluid only while the first mentioned valve is admitting fluid in an uninterrupted blast.

4. The combination with a continuous acting engine, such, for example, as a rotary engine or turbine, adapted to be actuated by an elastic fluid, said engine being provided with a main inlet for an operating fluid and an exhaust, said engine being also provided with an expansion stage, said expansion stage being provided with an auxiliary inlet for operating fluid, valve mechanism for controlling said inlets, mechanical means for operating said valve mechanism in unison with the motion of said engine, and a governor responsive to the speeds of the engine for controlling said valve mechanism to admit the operating fluid through said inlets to the engine.

5. The combination with an engine of a valve for admitting an operating fluid thereto, means for transmitting motion from said engine to said valve to cause said valve to open, a spring adapted to close said valve, and means adapted to permit said valve to be closed intermittently at underloads and to cause said valve to be retained open at normal and over loads.

6. The combination with a continuous acting engine, such, for example, as a rotary engine or turbine, adapted to be actuated by an elastic fluid, said engine being provided with a main inlet for an operating fluid and an exhaust, said engine being also provided with an expansion stage, said expansion stage being provided with an auxiliary inlet for operating fluid, a valve for controlling the flow of the operating fluid through said inlets, positively actuated mechanism operated in unison with the speeds of the engine adapted to move said valve in one direction, means to move said valve in the opposite direction, and a governor responsive to the speeds of the engine to control said positively actuated mechanism.

7. The combination with a continuous acting engine, such, for example, as a rotary engine or turbine, adapted to be actuated by an elastic fluid, said engine being provided with a main inlet for an operating fluid and an exhaust, said engine being also provided with an expansion stage, said expansion stage being provided with an auxiliary inlet for operating fluid, two valves for controlling the flow of the operating fluid through said inlets, positively actuated mechanism operating in unison with the speeds of the engine adapted to move said valves in one direction, means to move said valves in the opposite direction, and a governor responsive to the speeds of the engine to control said positively actuated mechanism.

8. The combination with a continuous acting engine, such, for example, as a rotary engine or turbine, adapted to be actuated by an elastic fluid, said engine being provided with a main inlet for an operating fluid and an exhaust, said engine being also provided with an expansion stage, said expansion stage being provided with an auxiliary inlet for operating fluid, a valve for each inlet to control the flow of the operating fluid therethrough, each of said valves being provided with a headed stem, arms adapted to engage with said headed stems to raise said valves from their seats, springs for returning said valves toward their seats, means for moving said arms, and a governor responsive to the speeds of the engine for controlling the action of said means upon said arms according to the speeds of said engine.

9. The combination with a continuous acting engine, such, for example, as a rotary engine or turbine, adapted to be actuated by an elastic fluid, said engine being provided with a main inlet for an operating fluid and an exhaust, said engine being also provided with an expansion stage, said expansion stage being provided with an auxiliary inlet for operating fluid, a valve for each inlet to control the flow of the operating fluid therethrough, each of said valves being provided with a headed stem, arms adapted to engage with said headed stems to raise said valves from their seats, springs for returning said valves towards their seats, means for moving said arms, a governor responsive to the speeds of the engine for controlling the action of said means upon said arms according to the speeds of said engine, and means to permit one of said valves to be moved towards its seat only to a limited extent.

In testimony whereof, I affix my signature in the presence of two witnesses.

ROBERT A. McKEE.

Witnesses:
FRANK E. DENNETT,
ARTHUR C. FLORY.